United States Patent [19]

Marks

[11] Patent Number: 5,292,857
[45] Date of Patent: Mar. 8, 1994

[54] PREPARATION OF NYLON 66 POLYMERS FROM 1,8-DIAZACYCLOTETRADECANE-2,7-DIONE

[75] Inventor: David N. Marks, Wilmington, Del.

[73] Assignee: E. I. Du Pont de Nemours and Company, Wilmington, Del.

[21] Appl. No.: 16,948

[22] Filed: Feb. 22, 1993

[51] Int. Cl.$^5$ .............................................. C08G 69/28
[52] U.S. Cl. .................................... 528/335; 528/271; 528/323; 528/324; 528/325; 528/367
[58] Field of Search ................ 528/335, 271, 367, 323, 528/324, 325

[56] References Cited

U.S. PATENT DOCUMENTS 2,241,323  5/1941  Greenewalt ......................... 528/373

Primary Examiner—Harold D. Anderson

[57] ABSTRACT

Nylon 66 polymer is prepared by condensation of a reaction mixture containing 1,8-diazacyclotetradecane-2,7-dione and nylon 66 salt and/or caprolactam.

2 Claims, No Drawings

PREPARATION OF NYLON 66 POLYMERS FROM 1,8-DIAZACYCLOTETRADECANE-2,7-DIONE

FIELD OF THE INVENTION

This invention relates to the preparation of nylon 66 homo and copolymers using 1,8-diazacyclotetradecane-2,7-dione as an ingredient in the starting reaction mixture.

BACKGROUND OF THE INVENTION

In the conventional commercial processes for the preparation of nylon 66 polymer, adipic acid and hexamethylene diamine are reacted. High molecular weight polymer is produced, but a by-product of this reaction is the formation of cyclic nylon 66 monomer, i.e. 1,8-diazacyclotetradecane-2,7-dione. 1,8-diazacyclotetradecane-2,7-dione has in the past been usually considered a waste product. It tends to be washed out of nylon fibers when the fibers are dyed.

1,8-diazacyclotetradecane-2,7-dione is disclosed in U.S. Pat. No. 2,241,323 to Greenewalt as a material suitable for use in the preparation of nylon polymers. In this patent the monomer is referred to as cyclic monomeric hexamethylene adipamide (14 annular atoms; M.P. 248 degrees C.)

SUMMARY OF THE INVENTION

The present invention is a process for the production of nylon 66 polymer (or copolymer when epsilon-caprolactam is included in the reaction mix) from 1,8-diazacyclotetradecane-2,7-dione which comprises (a) forming a reaction mixture containing 10 to 90 parts by weight 1,8-diazacyclotetradecane-2,7-dione and a complementary amount of the salt of adipic acid and hexamethylenediamine, and/or epsilon-caprolactam, (b) heating said mixture under a pressure greater than atmospheric pressure, (c) slowly lowering the pressure to atmospheric pressure while increasing the temperature to about 275 degrees C, (d) maintaining the temperature at about 275 degrees C and at a pressure no more than atmospheric pressure until polymer having a relative viscosity of at least about 25 is obtained.

DETAILED DESCRIPTION OF THE INVENTION 1,8-diazacyclotetradecane-2,7-dione can be recovered from nylon 66 polymer production processes involving condensation of adipic acid and hexamethylenediamine; however if this material, 1,8-diazacyclotetradecane-2,7-dione, is used as the sole starting monomer for production of 66 nylon using standard polymerization conditions, about 25 percent of the monomer will not react, and the product will not be useful as a polymer. A process has now been developed to produce satisfactory product from 1,8-diazacyclotetradecane-2,7-dione.

In order to produce satisfactory polymer from 1,8-diazacyclotetradecane-2,7-dione it is necessary for the reaction mixture to contain at least 10 percent by weight of the salt of adipic acid and hexamethylenediamine and/or epsilon-caprolactam. The reaction mixture is then processed in accordance with the steps outlined above. The recovered nylon 66 polymer (or copolymer) will be of high molecular weight; with a relative viscosity of at least about 25, where relative viscosity is measured at 25 degrees C. in a solution of 8.4% by weight polymer in formic acid containing 10% by weight water.

The conventional nylon additives: catalysts, pigments, anti-foam agents, antioxidants, and the like can be used in the process of the invention, or added to the nylon produced by the process of this invention.

EXAMPLES

1. A 300 cc stainless steel autoclave was charged with 26.7 grams of 1,8-diazacyclotetradecane-2,7-dione and 60.0 grams of a 51% aqueous nylon 66 salt solution.
2. A regulator controlling the pressure of the system was set for 250 psig.
3. The autoclave was closed and purged with nitrogen.
4. The contents of the autoclave were agitated and heated in 60 minutes to 250 degrees C.
5. After reaching 250 degrees C., the pressure was gradually reduced from 250 psig to atmospheric pressure over a one hour period by adjusting the pressure regulator. During the one hour the temperature was increased slowly to 275 degrees C.
6. The temperature of the autoclave was maintained at 275 degrees C. for 45 minutes.
8. The agitation was turned off and the autoclave was then allowed to cool.
8. After cooling the polymer was removed from the autoclave and the polymer dried at 90 degrees C. The relative viscosity was measured and found to be 49. This examples is contained in the table below as Item 5.

The table below summarizes the results obtained when the process was repeated using varying conditions. Items 1,2, and 8 are not examples of the invention, but instead controls. In items 6, 7 and 8, 0.2 grams of anhydrous was also charged to the autoclave with the other ingredients. Hexamethylenediamine

TABLE

| Item | Additive | wt % CM* | wt % additive | RV | % Methanol extractables |
|---|---|---|---|---|---|
| 1 | none | 100 | 0 | 15 | — |
| 2 | none | 100 | 0 | 15 | 25 |
| 3 | 66 salt | 89 | 11 | 33 | 7.5 |
| 4 | 66 salt | 75 | 25 | 44 | 6.8 |
| 5 | 66 salt | 50 | 50 | 49 | 3.7 |
| 6 | 66 salt | 25 | 75 | 51 | 1.8 |
| 7 | 66 salt | 10 | 90 | 57 | 1.2 |
| 8 | 66 salt | 0 | 100 | 57 | 1.2 |
| 9 | caprolactam | 50 | 50 | 36 | — |
| 10 | caprolactam | 10 | 90 | 41 | — |

CM* is cyclic monomer: 1,8-diazacyclotetradecane-2,7-dione.

I claim:
1. A process for the production of nylon 66 polymer or copolymer from 1,8-diazacyclotetradecane-2,7-dione which comprises (a) forming a reaction mixture containing 10 to 90 parts by weight 1,8-diazacyclotetradecane-2,7-dione and a complementary amount of at least one member of the group consisting of the salt of adipic acid and hexamethylenediamine, and epsilon-caprolactam, (b) heating said mixture under a pressure greater than atmospheric pressure, (c) slowly lowering the pressure to atmospheric pressure while increasing the temperature to about 275 degrees C., (d) maintaining the temperature at about 275 degrees C. and at a pressure no more than atmospheric pressure until polymer having a relative viscosity of at least about 25 is obtained, where relative viscosity is measured at 25 degrees C. in a solution of 8.4% by weight polymer in formic acid containing 10% by weight water.

2. The process of claim 1 in which the salt of adipic acid and hexamethylenediamine is present in the reaction mixture in an amount of at least 50 parts per 100 parts by weight of the reaction mixture.

* * * * *